Percy Pritchard.
INVENTOR.

ATTORNEYS.

Percy Pritchard
INVENTOR

P. PRITCHARD.
FOUNDRY MOLDING MACHINE.
APPLICATION FILED JAN. 28, 1920.

1,384,777.

Patented July 19, 1921.
5 SHEETS—SHEET 5.

Percy Pritchard
INVENTOR.

ATTORNEYS.

UNITED STATES PATENT OFFICE.

PERCY PRITCHARD, OF BIRMINGHAM, ENGLAND.

FOUNDRY MOLDING-MACHINE.

1,384,777.  Specification of Letters Patent.  Patented July 19, 1921.

Application filed January 28, 1920. Serial No. 354,600.

*To all whom it may concern:*

Be it known that I, PERCY PRITCHARD, a subject of the King of England, residing at 12 Melville road, Edgbaston, Birmingham, England, have invented certain new and useful Improvements in Foundry Molding-Machines, of which the following is a specification, reference being had therein to the accompanying drawings.

This invention comprises certain improvements in or relating to foundry molding machines.

According to this invention when the pattern plate or molding table has reached a predetermined height the air pressure is released, provision being made for supplying air to the cylinder at atmospheric pressure when the compressor piston has reached the bottom of its stroke.

In accordance with the present invention also the molding machine comprises a driving shaft for operating the pattern plate "jarring" mechanism, and means for withdrawing the mold driven from such driving shaft.

Figs. 6 and 7 are detail views hereinafter referred to.

Figure 1:
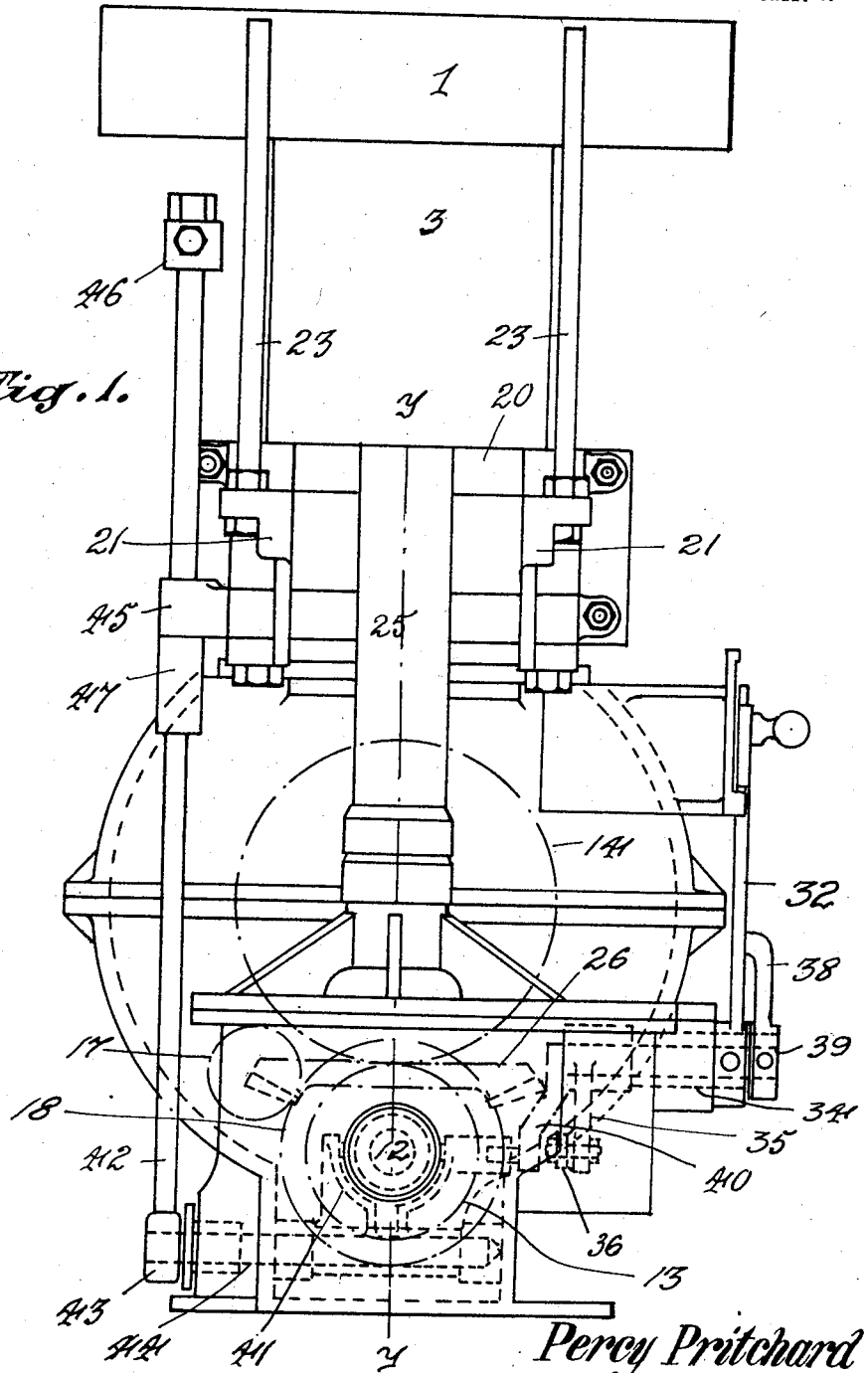
Figure 1 is a side elevation of a foundry molding machine constructed according to this invention.

The molding machine comprises a pattern plate 1 which is adapted to be raised and dropped by means of an air cushion which is alternatively compressed and the pressure released. The pattern plate 1 is bolted to the head of the ram 2 which is adapted to rise and fall in the cylinder 3. The piston 4 reciprocates in the cylinder 3 and therefore on the upward stroke compresses the air between the ram and the piston and thereby raises the ram, while on the downward stroke the pressure of the air is released which allows the ram to drop.

Conveniently eight ⅜ inch diameter holes 50 are drilled through the wall of the cylinder so that when the plunger or ram 2 has been raised to uncover these holes the air pressure is released. The plunger will, however, in virtue of its momentum move a little distance beyond these holes before dropping down to give the jarring effect. This return movement in this embodiment will be assisted by the suction caused by the return movement of the piston 4. When the piston 4 reaches the bottom of its stroke the hole 51 is uncovered to allow the air above the piston to be placed at atmospheric pressure. With this construction, therefore, the extent of the upward movement of the plunger 2 is limited by the release of the air pressure within the cylinder to substantially atmospheric pressure. The machine could thus be used with any weight on the molding table, the height to which the table is raised being limited by the air release, and therefore substantially the same in all cases.

In order to provide for varying weights of molds provision is made for varying the pressure of the air cushion in the cylinder 3. According to one convenient means a plate 5 has screwed engagement with the ram 2, whereby the volume of air inclosed between the ram 2 and piston 4 may be increased or reduced. The plate 5 is locked in any desired position by means of the bolt 6.

The piston is reciprocated by means of the connecting-rod 7 and the eccentric 8 formed integrally with the cam-shaft 9 which is journaled in the bearings 10 of the molding machine frame casing 54. The eccentric-shaft 9 is driven from the driving shaft 12 by means of the spur wheels 13 and 14. The spur wheel 13 runs loosely on the shaft 12 while the spur wheel 14 is bolted to the flange 15ª which is formed integrally with the eccentric-shaft 9. When the machine is required to be in operation the clutch member 15, which is keyed to the shaft 12, is slid endwise into engagement with the clutch member 16 on the spur wheel 13, as hereinafter described. The shaft 12 is driven by means of an electric motor the shaft of which carries the gear wheel 17 which is in mesh with the spur wheel 18 keyed to the shaft 12, the electric motor being bolted down to the base plate 19.

Means for removing the mold from the pattern are conveniently driven from the shaft 12 aforementioned. According to one form thereof the band 20 is adapted to slide up and down on the cylinder 3. This band carries four arms 21, which arms are hinged to lugs 22 on such band. These arms carry the uprights 23 which are adapted to remove the mold when the band 20 slides up the cylinder 3, the uprights being adjustable in slots along the arms 21 to allow for varying sized molds. To raise the band 20 the screwed spindle 24 engages the screwed projection 25 of the band. This screwed spindle is rotated by means of bevel gear wheel 26 secured to such spindle. This bevel wheel is in mesh with the bevel wheels 27 and 28 which run freely on the shaft 12, and to raise the band 20, the clutch member 29, keyed to the shaft 12, is moved into engagement with the clutch member 30 on the bevel wheel 28, while to lower the band 20, the clutch member 29 is moved into engagement with the clutch member 31 on the bevel wheel 27. A ball bearing 24ª is provided to take the end thrust on the shaft 24.

To operate the clutch member 15, the hand lever 32 is moved over the switch board 33. The hand lever 32 and lever 35 are secured to the sleeve 34, while the link 36 connects the rocker 37 and lever 35, so that when the hand lever is pulled over the rocker 37 moves the clutch member 15 into engagement with the clutch member 16.

To operate the mold lifting mechanism the lever 38 is secured to the spindle 39, the movement of which, through the medium of the lever 40, operates the rocker 41 for moving the clutch member 29 into engagement with either the clutch member 30 or 31.

In order to unclutch the member 29 when the mold lifting mechanism has reached the top or bottom of its required movement, suitable automatic means are provided. According to the means illustrated the rod 42 is connected by the lever 43 and pin 44 to the rocker 41 so that when this rod 42 is moved up or down the clutch member 29 is moved out of engagement with the members 30 or 31. To effect this movement at the required times the rod 42 passes through a sleeve 45 on the band 20 and stops 46 and 47 are provided on such rod 42. Thus when the pattern lifting mechanism has reached the limit of its upward movement the sleeve 45 moves against the adjustable stop 46 and lifts the rod for declutching as aforedescribed. When the lifting mechanism has reached the limit of its downward movement the sleeve 45 moves against the stop 47 and declutches as aforedescribed.

Figures 6, 7:
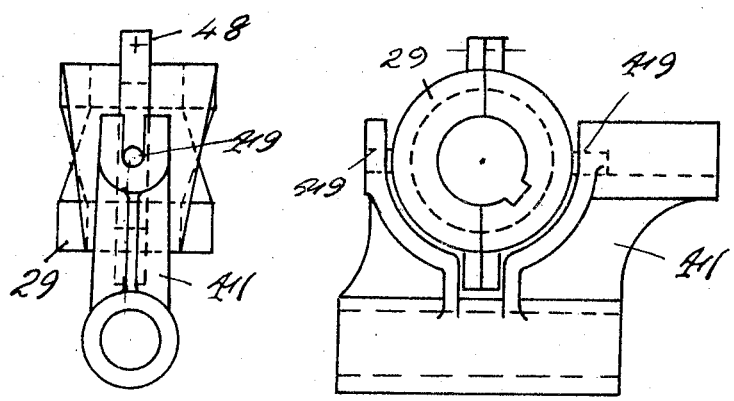

The clutch members 29 and 15 are fitted with collar pieces 48 (Figs. 6 and 7) having trunnions 49 which engage the rockers 37 and 41.

Figure 2:
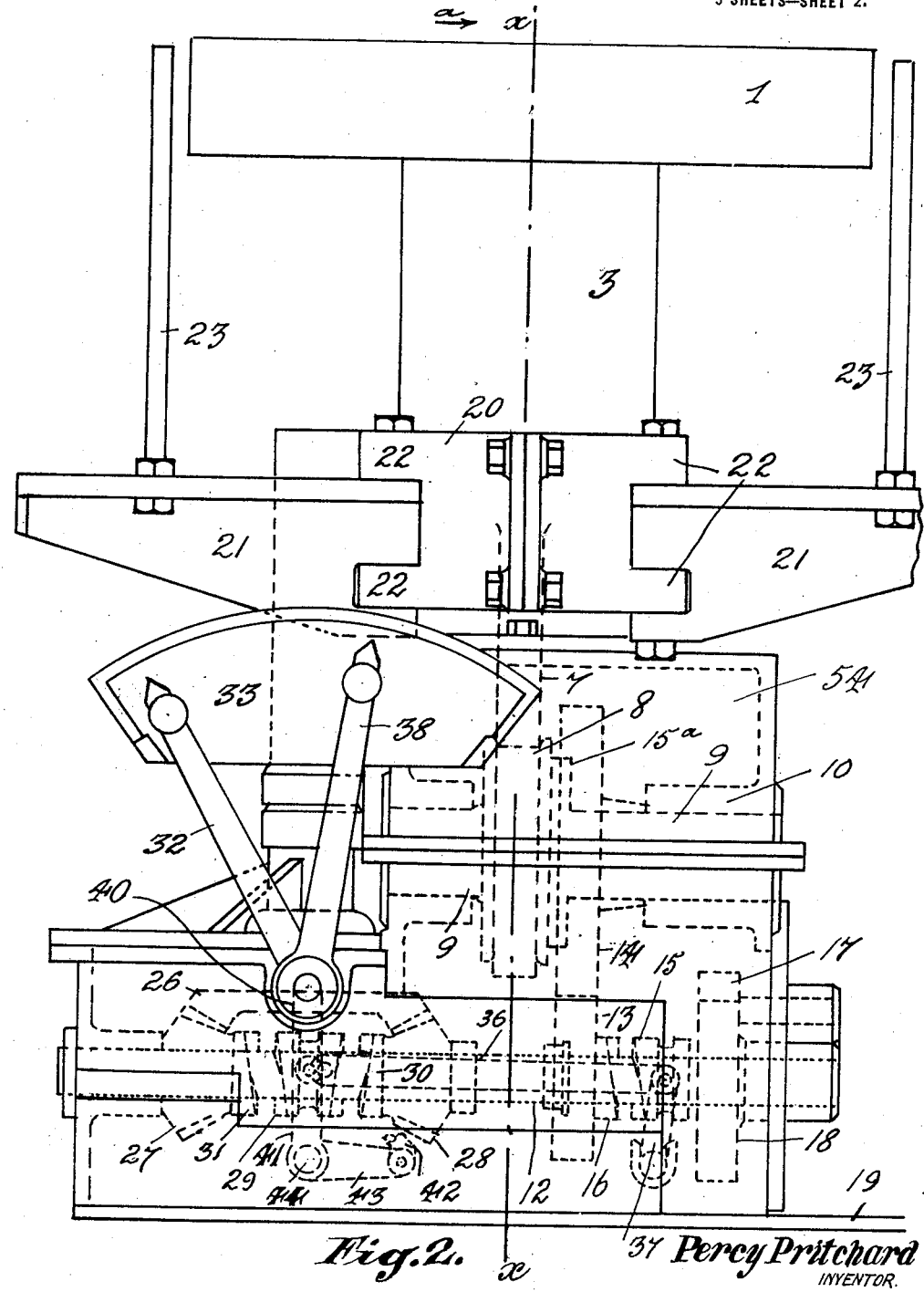
Fig. 2 is a front elevation of the machine shown by Fig. 1.
Figure 3:
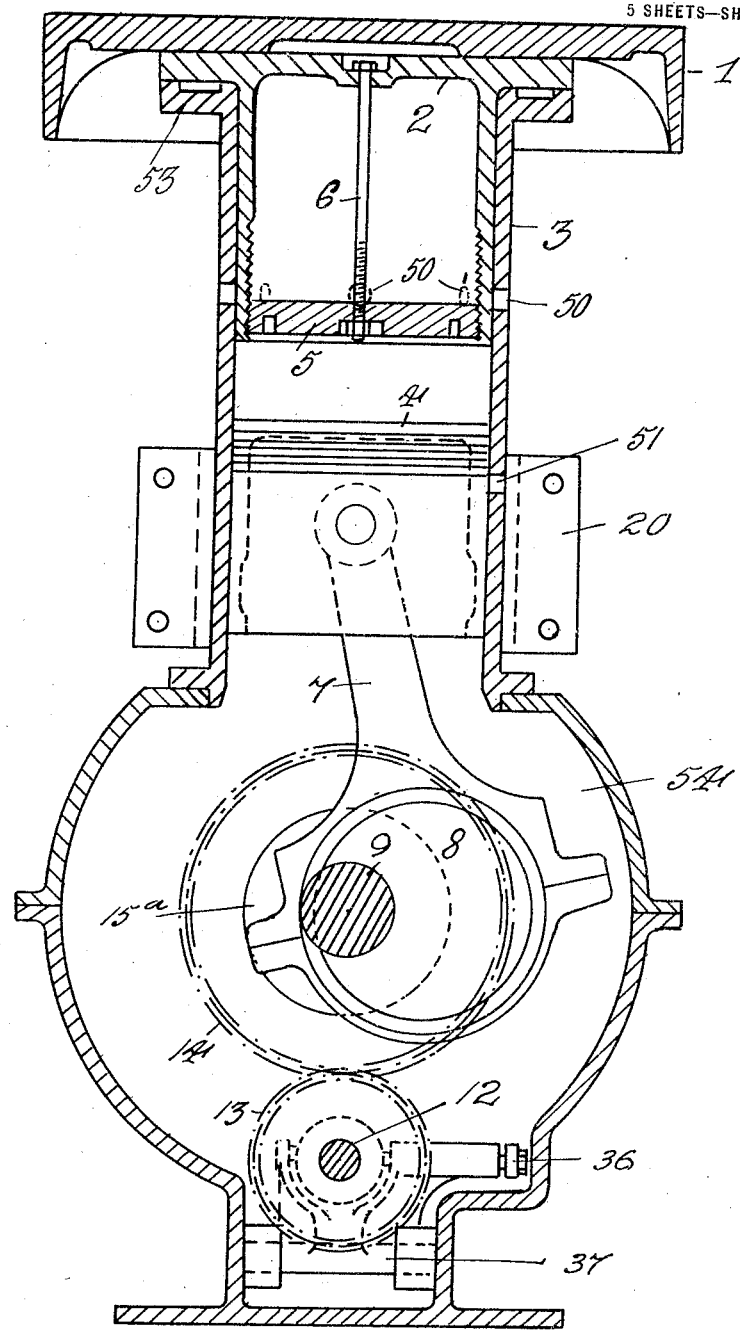
Fig. 3 is a section on line X X of Fig. 2 looking in direction of arrow *a*.
Figure 4:
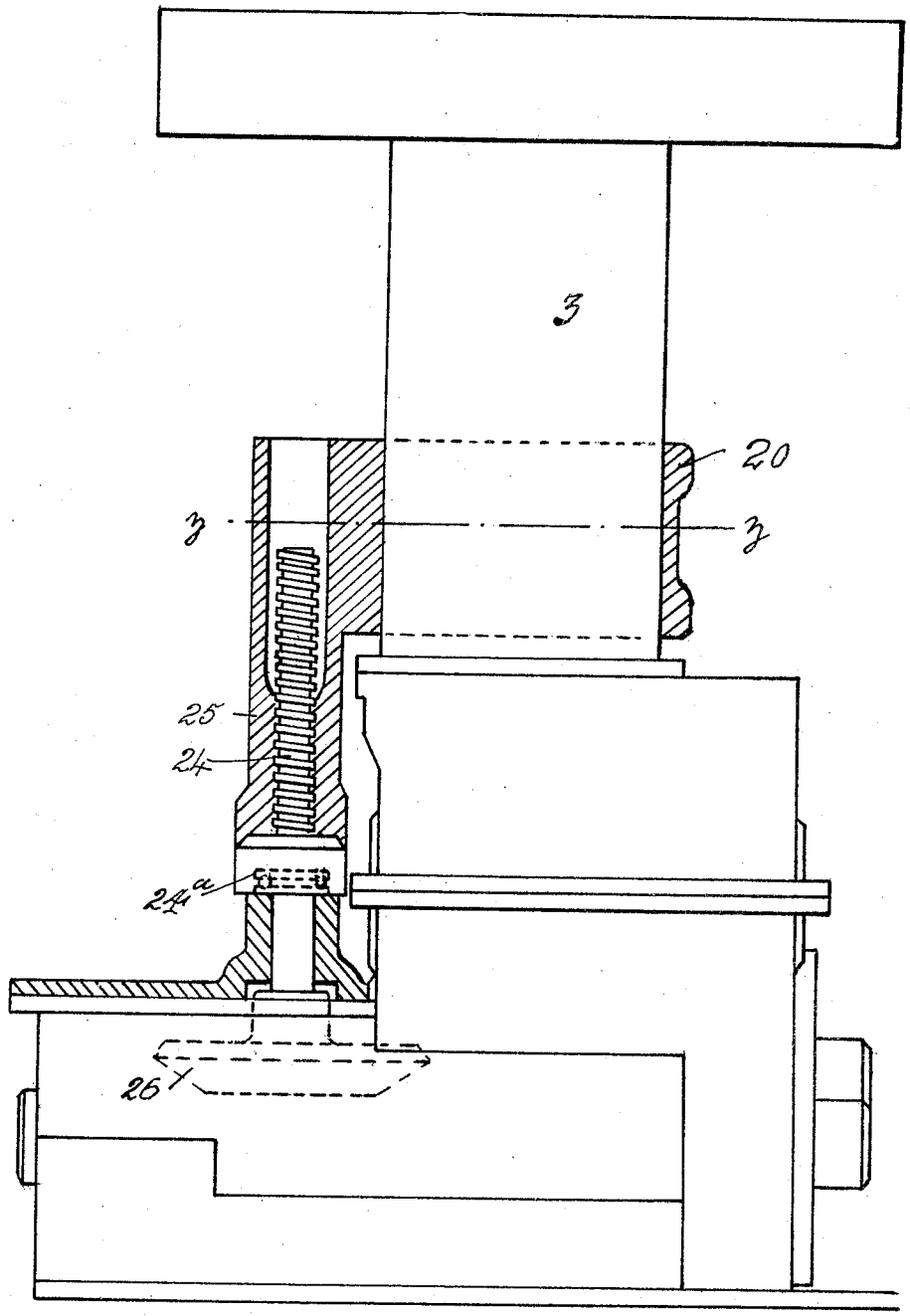
Fig. 4 is a section elevation, the section being on line Y Y of Fig. 1.
Figure 5:
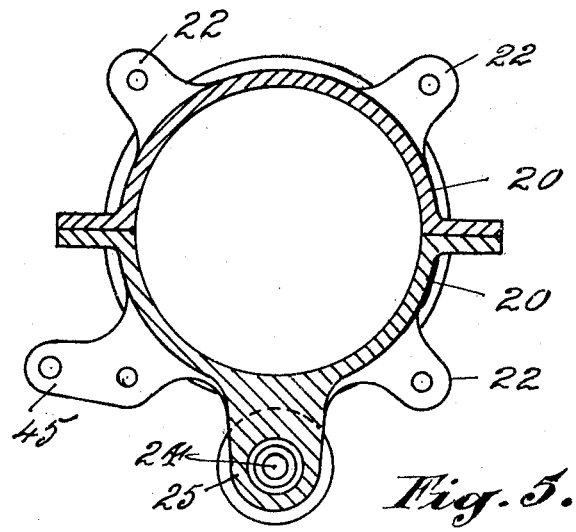
Fig. 5 is a section on line Z Z of Fig. 4 of the lifting band.

The hand levers 32 and 38 are so arranged that when the cam-shaft is rotating, the lifting mechanism cannot be raised. For this purpose the upper parts of the hand levers 32 and 38 are arranged in the same plane, and therefore if the lever 32 is moved over for starting in motion the cam-shaft, the lever 38 must be moved into the neutral position shown by Fig. 2. Again if the cam-shaft is in operation and the lever 38 is moved over for raising the lifting mechanism, the lever 32 will be moved to declutch the member 15. When the lifting mechanism is in the lowered position the lever 38 cannot be moved over for lowering the lifting mechanism, the stop 47 preventing any such movement.

Claims.

1. A foundry molding machine comprising a vertical air cylinder, a compressor piston adapted to reciprocate in such vertical cylinder, a pattern plate or molding table having a plunger thereon entering the air cylinder and being adapted to be raised by the compressed air cushion formed by said piston, air release passage or passages formed in the wall of said vertical cylinder for releasing the air pressure when the molding table has reached a predetermined height, air inlet passage or passages formed in the wall of the cylinder whereby when the piston reaches the bottom of its stroke the air inside the cylinder is placed at atmospheric pressure, and mold removing mechanism slidably mounted on the wall of the air cylinder, substantially at set forth.

2. A foundry molding machine comprising an air cylinder, a piston adapted to reciprocate therein, a pattern plate or molding table adapted to be raised by the compressed air cushion formed by said piston, said pattern plate being secured to a plunger reciprocating within the air cylinder, and an adjustable plate or disk fitted to the plunger for varying the volume of air inclosed between the plunger and piston substantially as set forth.

3. A foundry molding machine comprising a molding table or pattern plate, a driving shaft, means for imparting a jarring action to the molding table driven from said shaft, and means for withdrawing the mold which means are driven from said driving shaft, substantially as set forth.

4. A foundry molding machine comprising an air cylinder, a pattern plate or molding table, a piston adapted to reciprocate within the air cylinder for imparting a jarring action to the molding table by compressed air, a driving shaft geared to an eccentric shaft for driving the jarring mechanism and a screwed vertical spindle driven from said driving shaft for raising and lowering the mold lifting mechanism, substantially as set forth.

5. A foundry molding machine comprising an air cylinder, a pattern plate or molding table, a piston adapted to reciprocate within the air cylinder for imparting a jarring action to the molding table by compressed air, a driving shaft for operating said piston, mold removing mechanism slidingly mounted on the wall of the air cylinder and means for operating said mold removing mechanism driven from said driving shaft, substantially as set forth.

6. A foundry molding machine comprising a molding table or pattern plate, a driving shaft, means for imparting a jarring action to the molding table driven from said shaft, means for withdrawing the mold which means are driven from said driving shaft, means whereby the driving shaft may be placed into and out of gear with the pattern plate jarring mechanism, means whereby the driving shaft may be placed into and out of gear with the mold lifting mechanism and means whereby when the pattern plate jarring mechanism is put in operation the mold lifting mechanism is put out of gear and vice versa, substantially as set forth.

7. A foundry molding machine comprising an air cylinder, a pattern plate or molding table, a piston adapted to reciprocate within the air cylinder for imparting a jarring action to the molding table by compressed air, a driving shaft geared to an eccentric shaft for driving the jarring mechanism, a screwed vertical spindle driven from said driving shaft for raising and lowering the mold lifting mechanism, means whereby the driving shaft may be placed into and out of gear with the pattern plate jarring mechanism, means whereby the driving shaft may be placed into and out of gear with the molding lifting mechanism, and means whereby when the pattern plate jarring mechanism is put in operation the mold lifting mechanism is put out of gear and vice versa, substantially as set forth.

8. A foundry molding machine comprising a molding table or pattern plate, a driving shaft, means for imparting a jarring action to the molding table driven from said shaft, means for withdrawing the mold which means are driven from said driving shaft, means whereby the driving shaft may be placed into and out of gear with the pattern plate jarring mechanism, means whereby the driving shaft may be placed into and out of gear with the mold lifting mechanism, means whereby when the pattern plate jarring mechanism is put in operation the mold lifting mechanism is put out of gear and vice versa, and means whereby the mold lifting mechanism is automatically placed out of gear with the driving shaft when the lifting mechanism has reached the bottom of its required movement, substantially as set forth.

In witness whereof I have signed this specification in the presence of two witnesses.

P. PRITCHARD.

Witnesses:
J. E. S. ROCKWOOD,
J. WILLIAMS.